Aug. 4, 1936.   H. E. BRELSFORD ET AL   2,049,421
SOOT BLOWER
Filed Sept. 10, 1932    10 Sheets-Sheet 3
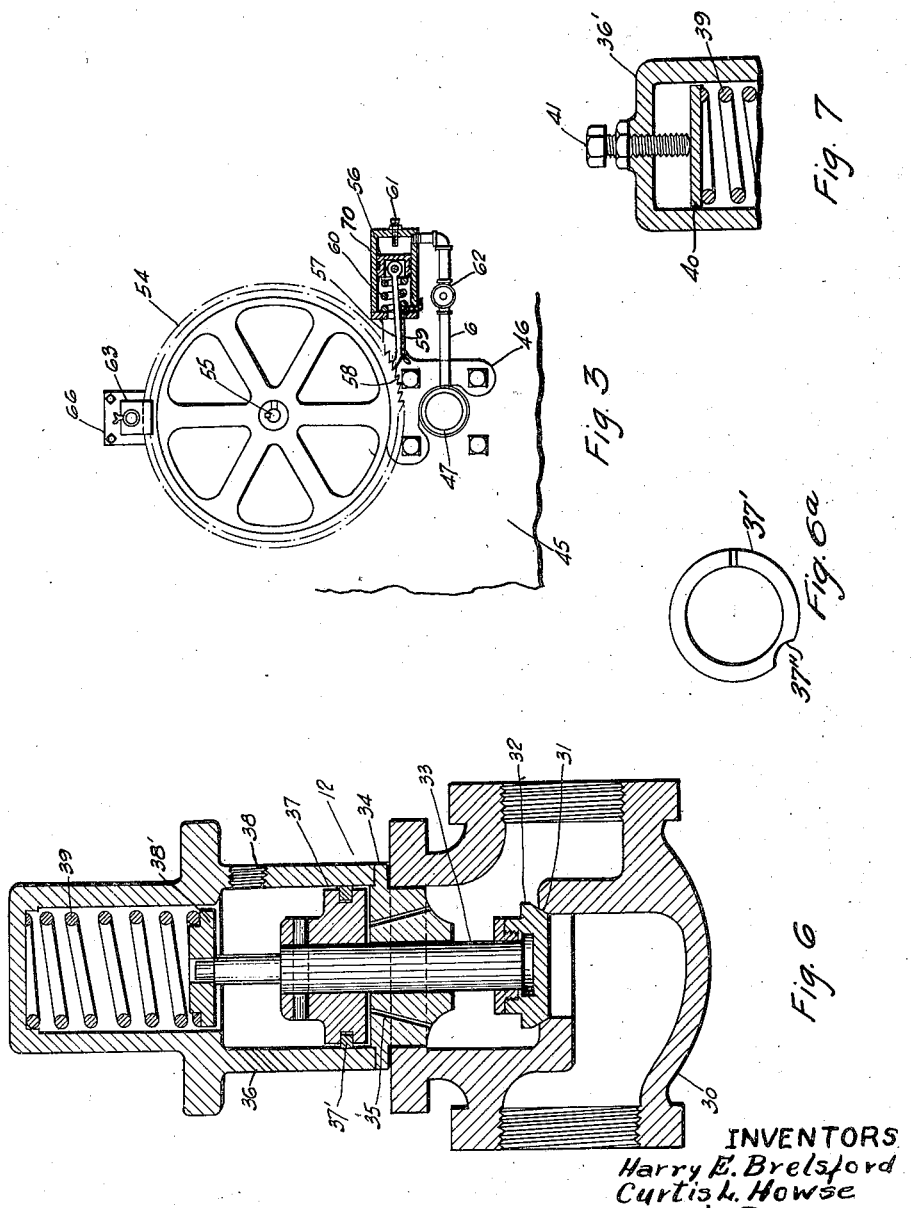
INVENTORS
Harry E. Brelsford
Curtis L. Howse
Frank Bowers
BY
ATTORNEYS

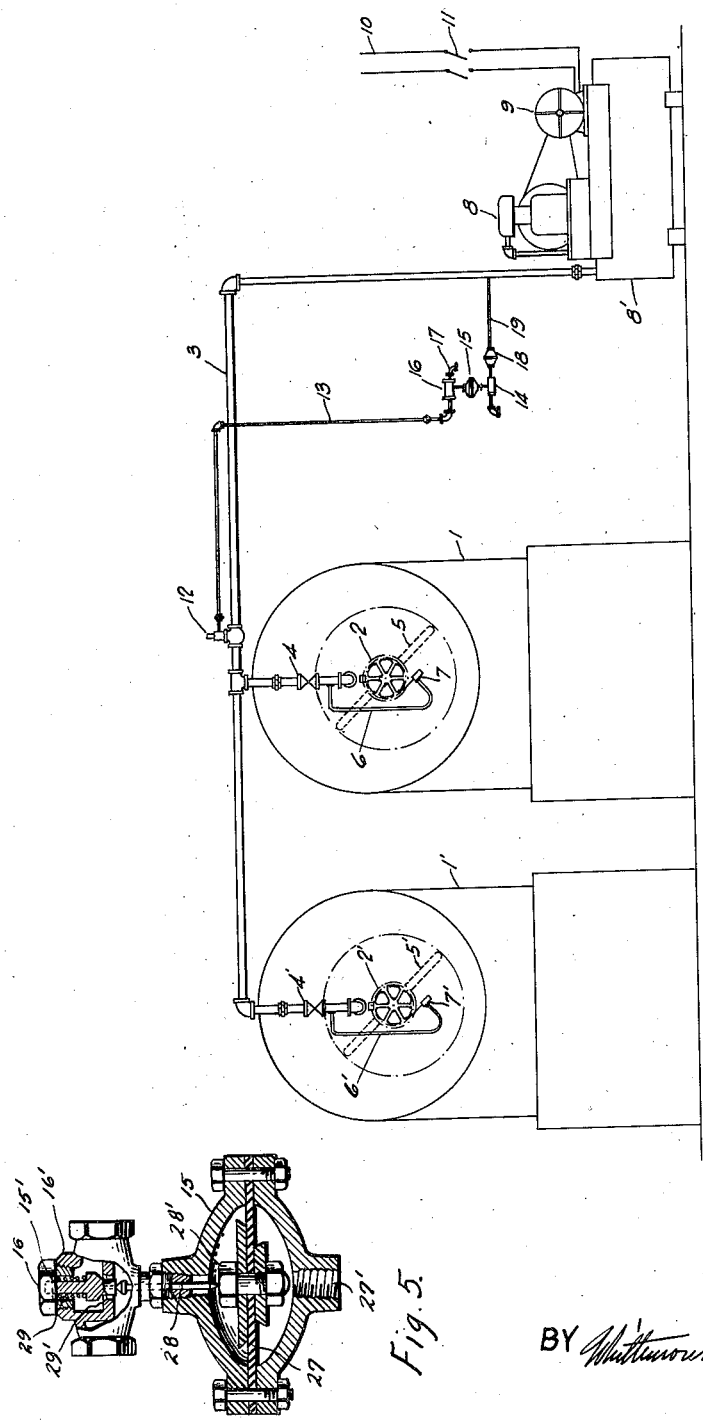

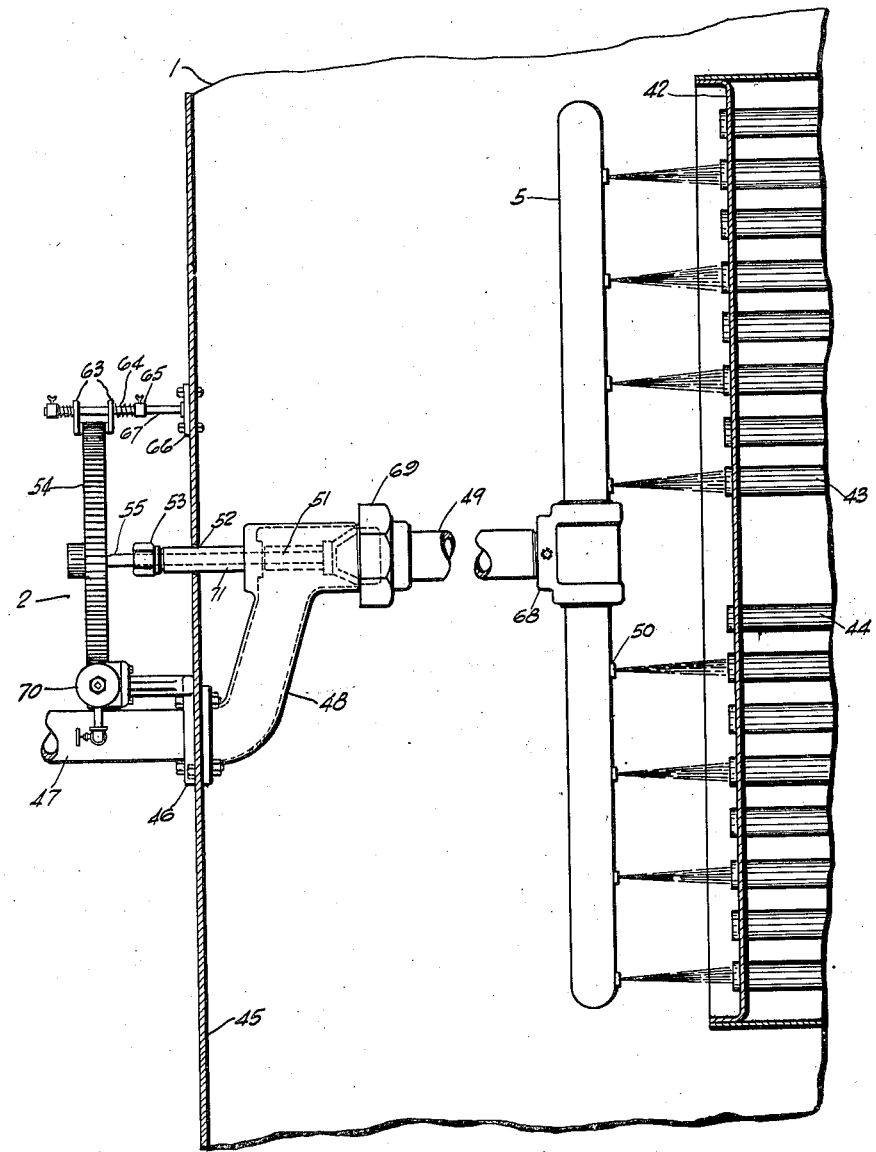

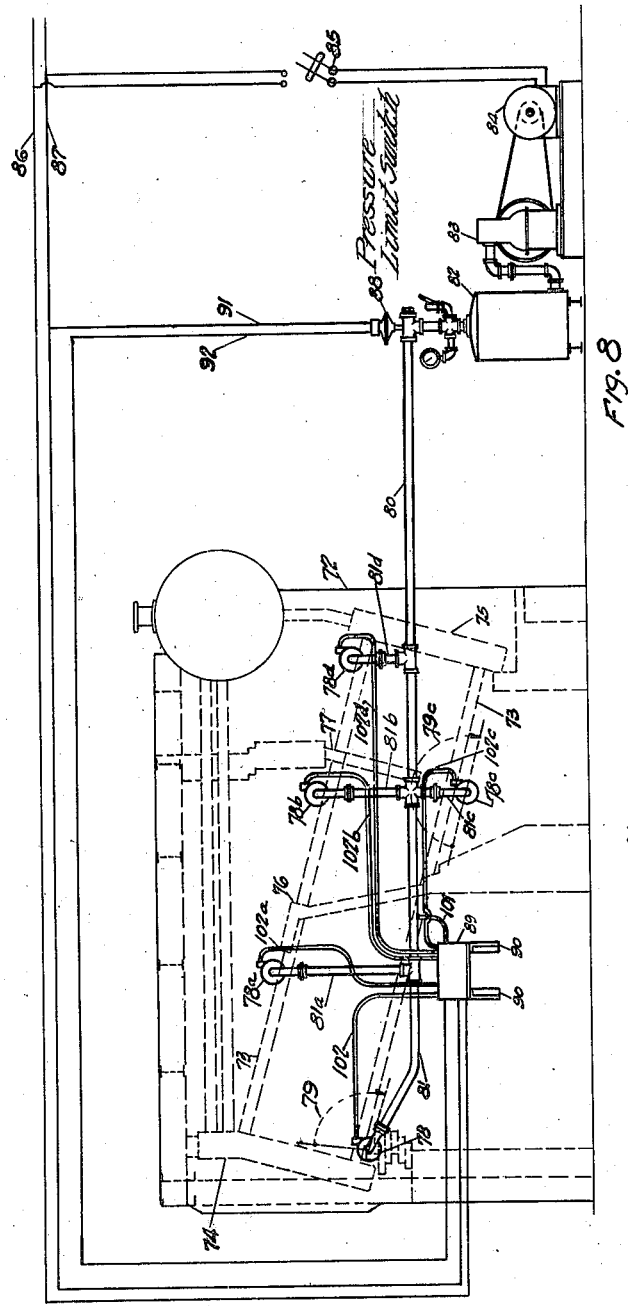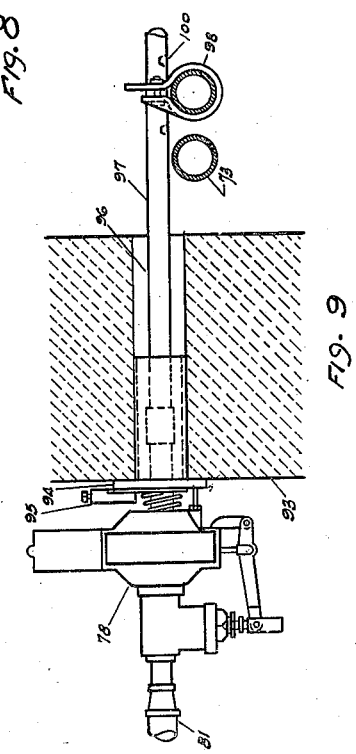

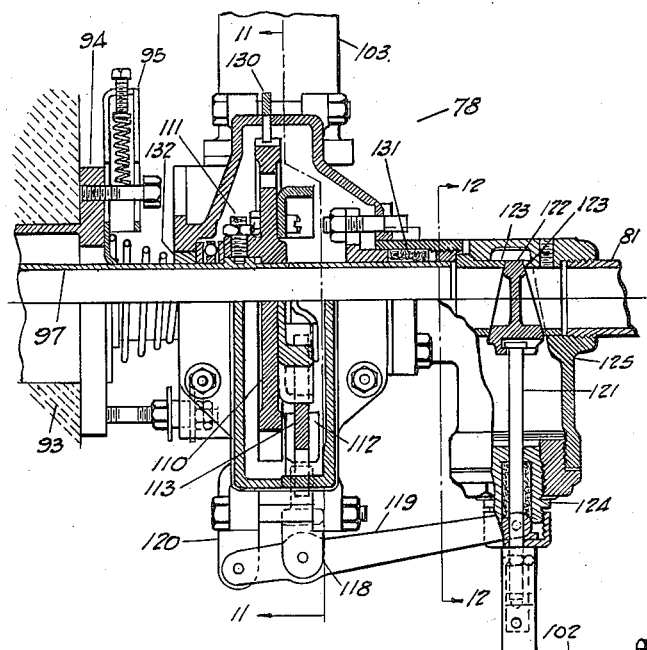
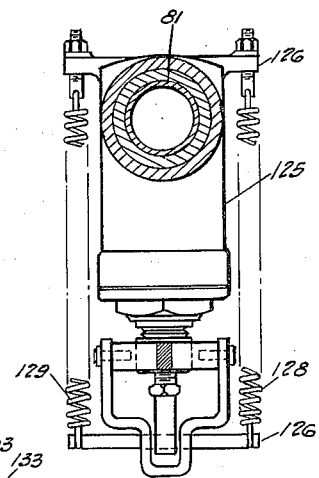
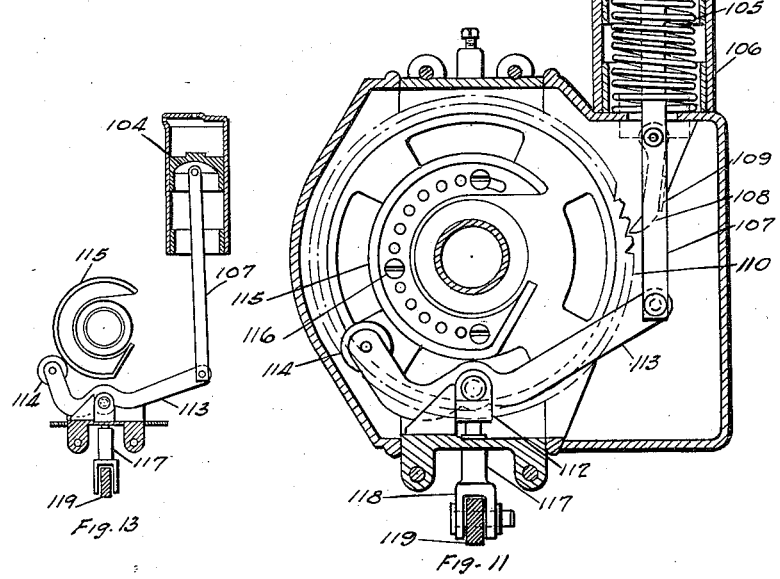
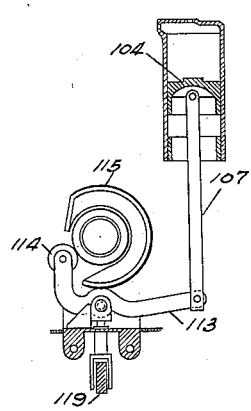

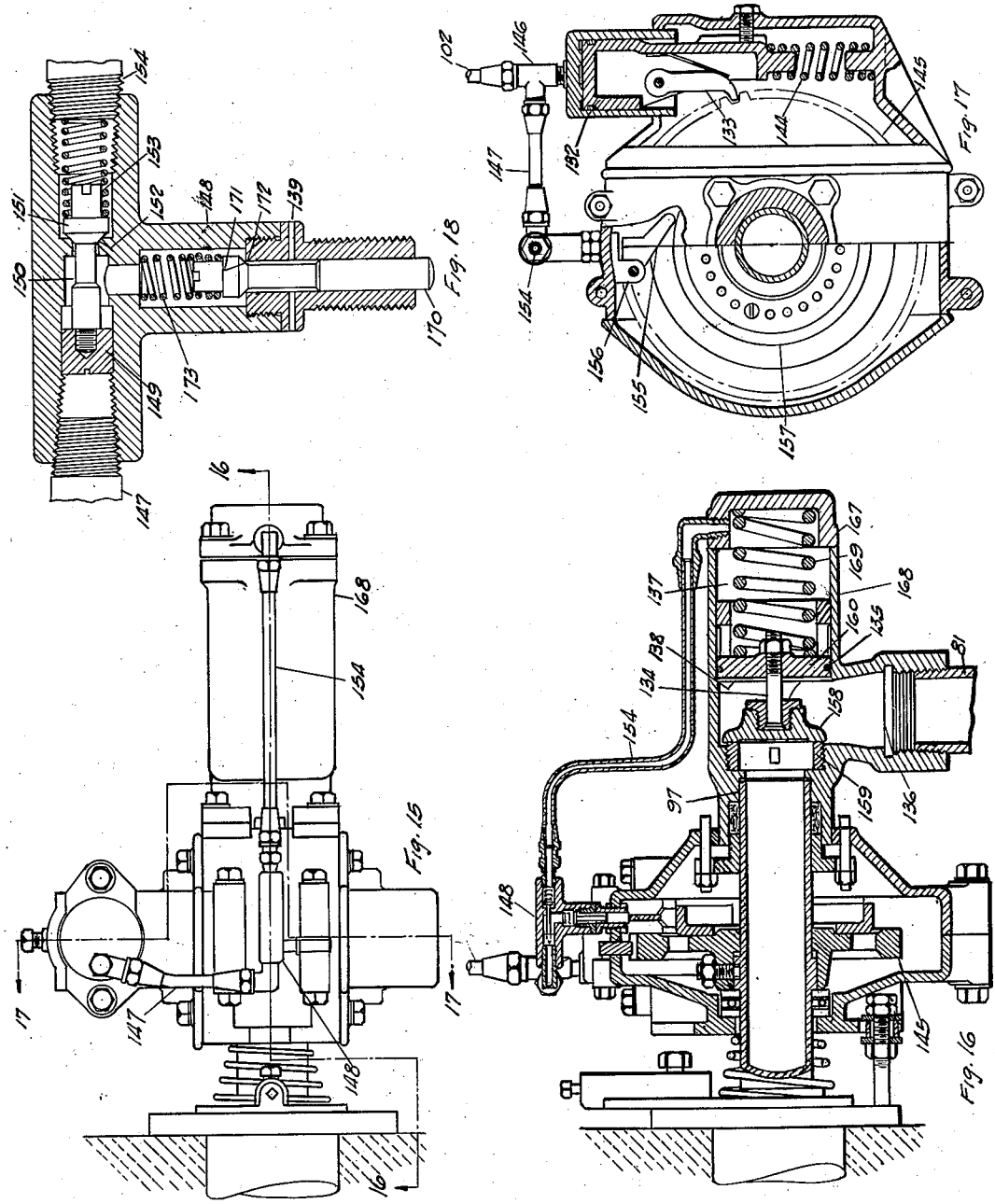

Aug. 4, 1936.    H. E. BRELSFORD ET AL    2,049,421
SOOT BLOWER
Filed Sept. 10, 1932    10 Sheets-Sheet 7
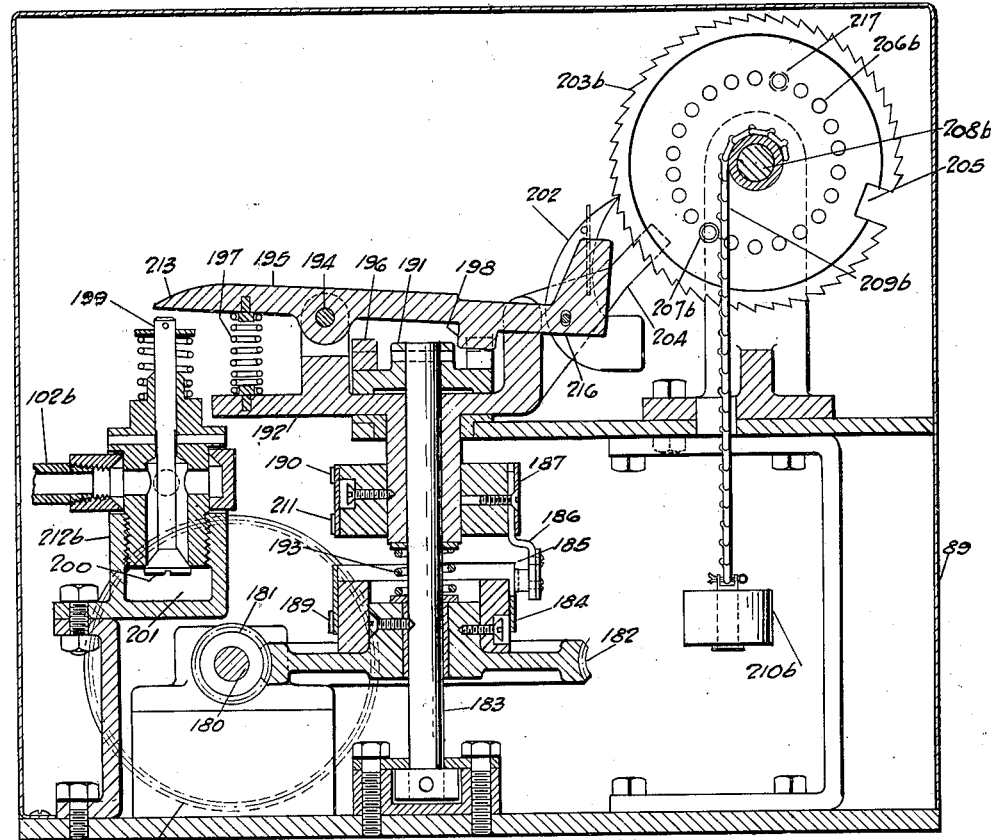
Fig. 20
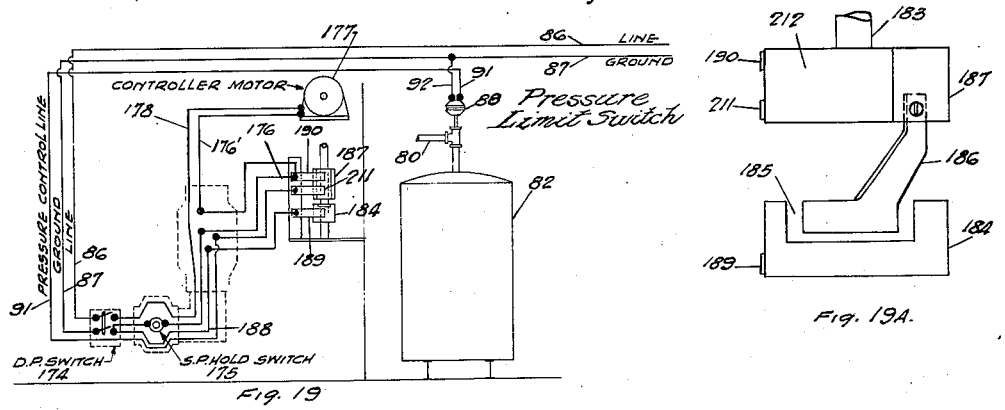
Fig. 19
Fig. 19A.
INVENTORS
Harry E. Brelsford
Curtis L. Howse
Frank Bowers
BY
Whittemore Hulbert
Whittemore Belknap
ATTORNEYS Aug. 4, 1936.　　　H. E. BRELSFORD ET AL　　　2,049,421
SOOT BLOWER
Filed Sept. 10, 1932　　　10 Sheets-Sheet 8

INVENTORS.
Harry E. Brelsford
Curtis L. House
Frank Bowers
BY
Whittemore Hulbert
Whittemore Belknap
ATTORNEYS

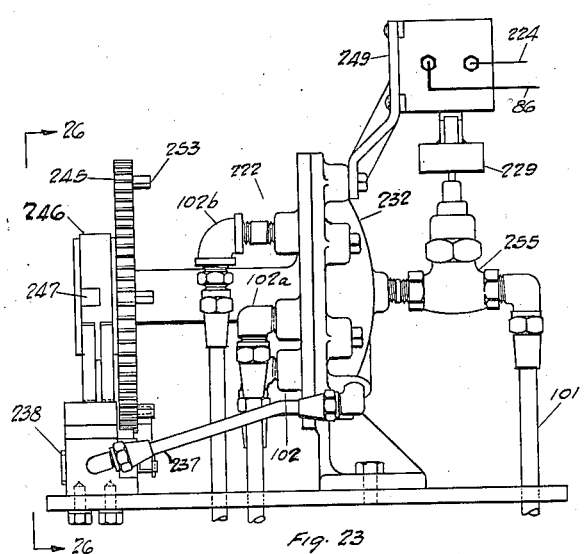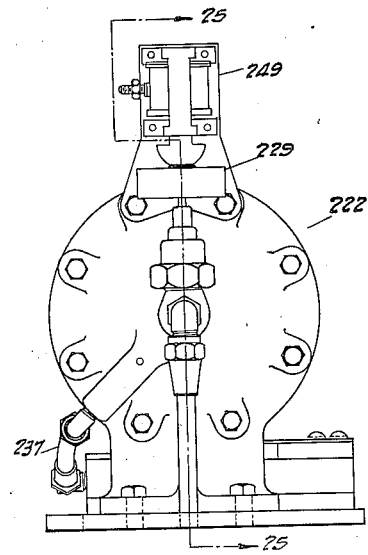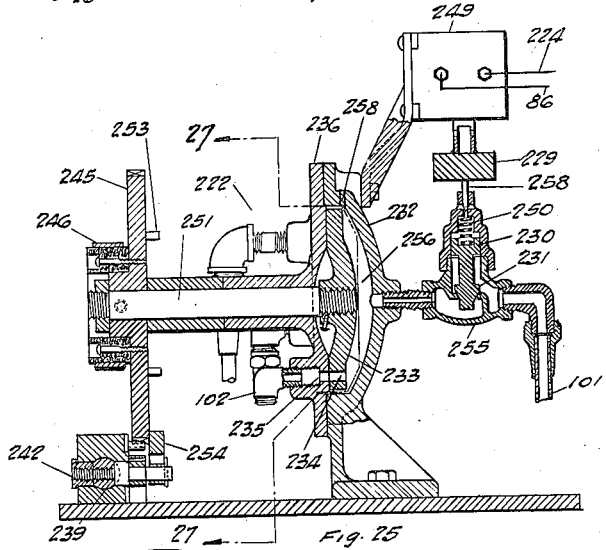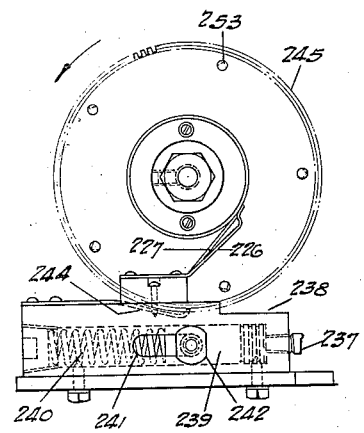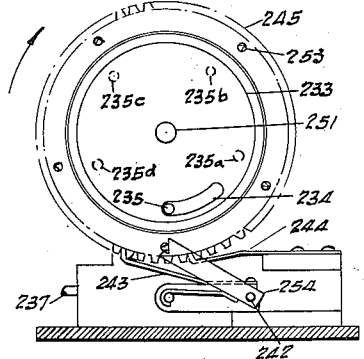

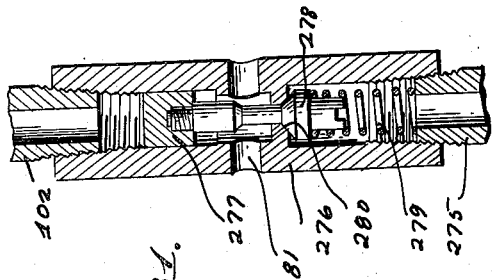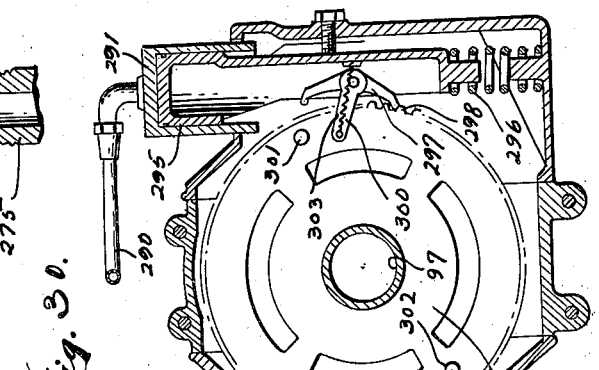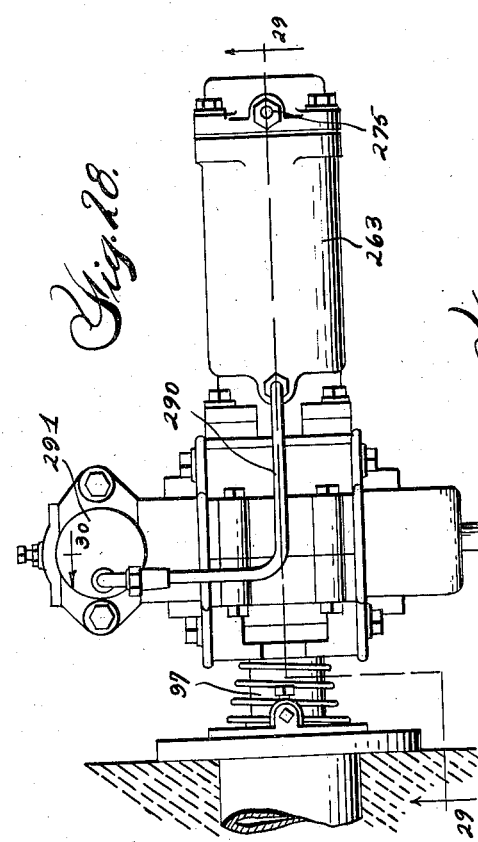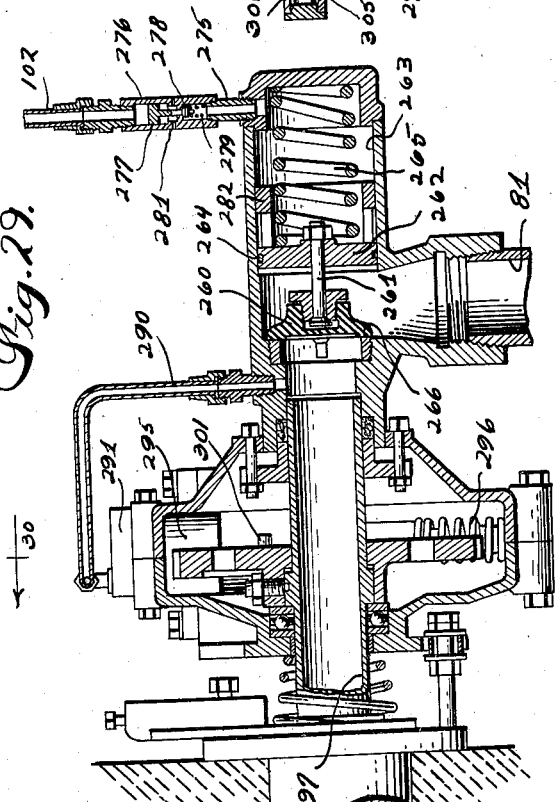

Patented Aug. 4, 1936

2,049,421

UNITED STATES PATENT OFFICE 2,049,421

SOOT BLOWER

Harry E. Brelsford, Birmingham, and Curtis L. Howse and Frank Bowers, Detroit, Mich., assignors to Diamond Power Specialty Corporation, Detroit, Mich., a corporation of Michigan Application September 10, 1932, Serial No. 632,614

24 Claims. (Cl. 122—392)

The invention is directed to means for cleaning boilers or other heat exchange apparatus, and comprises the provision of means for discharging adjacent the heating surfaces thereof, jets of cleaning fluid to dislodge from said surfaces deposits which may be formed thereon.

The invention will best be understood by reference to the drawings, wherein—

Figure 1 is an elevation showing one form of the invention applied to two boilers of the horizontal return tubular type.

Figure 2 is a side elevation of this form of cleaner applied to the boiler, the latter being in section.

Figure 3 is an end elevation of this same form of cleaner, the operating mechanism being shown partly in section.

Figure 4 is a sectional view of the pressure actuated control valve.

Figure 5 is a view principally in section of the pilot valve with its actuating diaphragm.

Figure 6 is a sectional view of the fluid actuated supply valve.

Figure 6a is a view of the piston ring used in the fluid actuated supply valve.

Figure 7 is a sectional view of a modified detail of the fluid actuated control valve.

Figure 8 is an elevation showing a second form of the invention applied to a boiler of the water tube type.

Figure 9 is a fragmentary side elevation partly in section showing the application of one of the cleaner units of the second form to the boiler.

Figure 10 is a side view principally in section of one type of operating head as used with the second form of the invention, omitting a portion of the operating piston.

Figure 11 is a sectional view taken substantially on line 11—11 of Figure 10, the operating piston being completely shown.

Figure 12 is a sectional view of the supply valve operating mechanism, taken on lines 12—12 of Figure 10.

Figure 13 is a schematic view of the operating piston and associated levers, the operating piston being shown in actuated position and the levers being shown in such position that the supply valve is actuated.

Figure 14 is a view similar to Figure 13, except that the levers are shown in position where the supply valve is not actuated.

Figure 15 is a plan view of an alternate form of head as used in the second form of the invention.

Figure 16 is a sectional view on line 16—16 of Figure 15.

Figure 17 is a sectional view substantially on line 17—17 of Figure 15, a small portion being broken away.

Figure 18 is a section through the pilot valve controlling the pistons actuating the element and valve.

Figure 19 is a wiring diagram for a first type of controller utilized in the second form of the invention.

Figure 19A is a schematic showing of the contact drums and brushes as utilized in the controller of the first type.

Figure 20 is a sectional view on line 20—20 of Figure 21.

Figure 23 is a side elevation of the second type of controller.

Figure 24 is an end elevation of the second type of controller.

Figure 25 is a section on line 25—25 of Figure 24.

Figure 26 is an end view of the contact drum and actuating gear and piston as used in the second type of controller, being a partial end view along lines 26—26 of Figure 23.

Figure 27 is a sectional view showing part of the gear actuating the contact drum, viewed as indicated by lines 27—27 in Figure 25.

Figure 28 is a view similar to Figure 15 showing a slightly different form of operating head.

Figure 29 is a sectional view taken substantially on the line 29—29 of Figure 28.

Figure 30 is a sectional view taken substantially on the line 30—30 of Figure 28; and Figure 31 is an enlarged sectional view of a portion of the structure shown in Figure 29.

Figure 21:
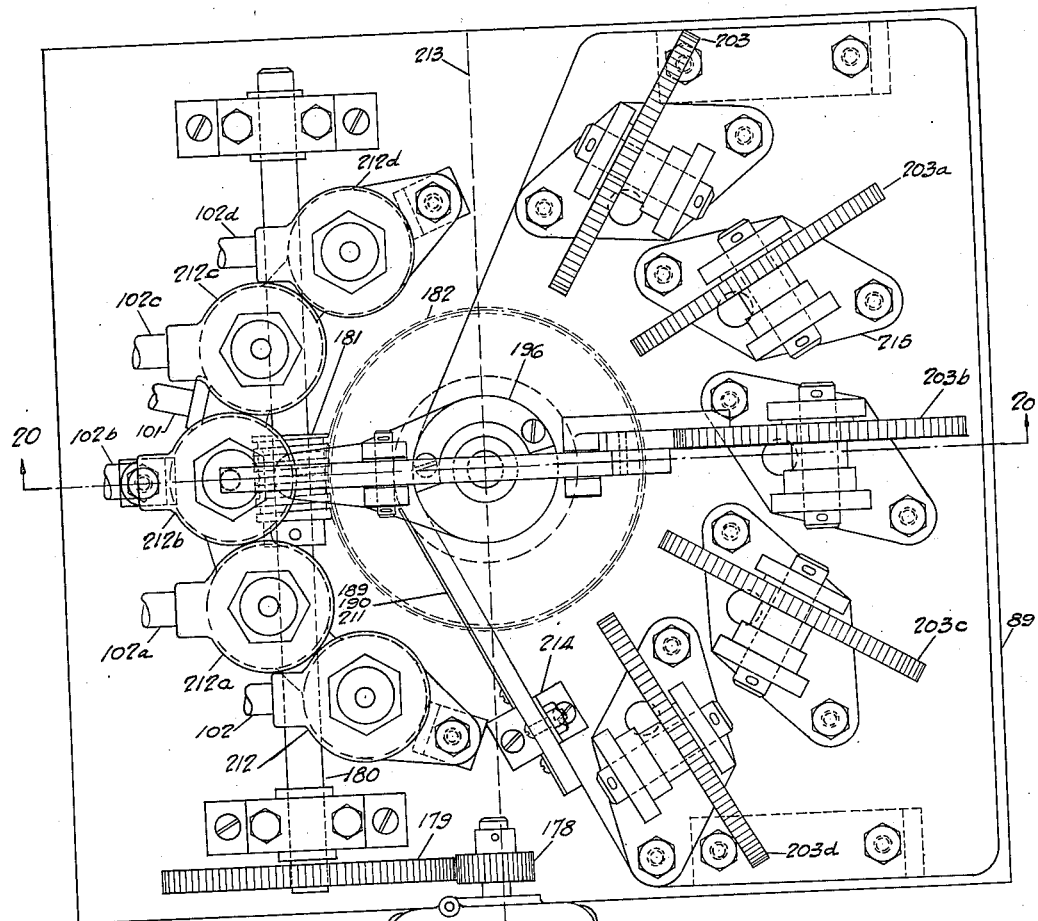
Figure 21 is a plan view of the first type of controller.

There will be described first the form of the invention shown in Figures 1 to 7 inclusive. In this form, boiler cleaners comprising nozzled elements are shown applied to the rear door of boilers of the fire tube type. The nozzled elements are moved to clean the tubes of the boiler by means of a piston actuated by the pressure of the cleaning fluid. In this case the cleaning fluid is shown as compressed air supplied from a motor driven compressor and storage tank of conventional construction. A pressure actuated valve controls the supply of the cleaning fluid to the boiler cleaner and is so constructed as to admit the cleaning fluid to the boiler cleaner at a

passes through packing gland 53, through nipple 71 to the interior of the fitting 48. Attached to rod 55 within the fitting 48 is the spider 51 engaging the threaded end of nipple 49. It will thus be evident that upon rotation of shaft 55, nipple 49 and hence the nozzle blower member 5 may be rotated.

Fitted to one end of shaft 55 is gear 54 provided with the ratchet teeth 58.

Branched from the cleaning fluid supply line 47 is the pipe 6 fitted with regulating valve 62, leading to piston housing 70. Bracket 46 fixed suitably to plate 45 is provided for supporting the piston housing.

Mounted within the piston housing 70 is the piston 56 to which is fitted the pawl 57 adapted to engage the teeth 58 on gear 54. Leaf spring 59 is provided for holding the pawl in engagement with the ratchet teeth.

Within the piston housing spring 60 is provided engaging at one end the housing and at the other end the piston 56. Upon operation of control valve 12 as hereinbefore described air will be admitted under pressure to the supply line 47 from whence it passes not only to the blower element through fitting 48 and nipple 49, but also to the piston housing where it acts upon one end of piston 56 forcing this to the left in Figure 3 and actuating the gear 54.

Thus, upon admission of the cleaning fluid to the blower unit not only is this discharged from the nozzles 50 but it also serves to actuate the blower element rotatively.

The rate of movement of piston 56 may be controlled by regulation of valve 62 in the branch line 6 leading to the piston housing. Screw 61 serves to regulate the amount of travel of the piston 56.

In case the two sections of the blower arm 5 are not perfectly balanced, it may be desirable to impose friction upon the gear 54 to prevent the blower member over-running as it passes its dead center. For this purpose the two plates 63 may be provided held by springs 64 against the rim of the gear 54. These plates may be suitably mounted upon rod 67, fixed in bracket 66, attached to the plate 45. The tension of these springs 64 may be regulated by the adjusting nuts 65. By this arrangement an even steady travel of the gear 54 and hence the blower element 5 is obtained.

It will be apparent that the maximum and minimum pressure limits between which compressed air is passed to the cleaner unit will depend upon the properties of the spring in the control valve. Considerable variation in these limits is possible due to varying the spring characteristics or varying the tension in the spring as indicated in the adjustable modification shown in Figure 7. It may be stated that in practice satisfactory results have been obtained with the maximum pressure of 120# and a minimum pressure of 75 to 80#.

The amount of air discharged at each puff through the boiler cleaner unit will depend, for a given maximum and minimum pressure limit, on the capacity of the storage tank and the supply lines up to the control valve. The time it takes to discharge the amount of air in a given puff will, of course, depend upon the number of nozzles in the blower member 5. The time required to restore the pressure of the compressed air in the storage tank after a puff through the boiler cleaner will depend, of course, upon the capacity of the compressor unit.

In the form of invention just described, it will be evident that a single cleaner unit is applied to each boiler to be cleaned. This is capable, as is evident, of rotation through 360°. In the application of this same invention to water tube boilers, two further variables are introduced. It is necessary, in cleaning the conventional type of water tube boiler to install a plurality of boiler cleaner units, five of such units being shown in Figure 8. It is also necessary to vary the arc through which cleaning fluid is discharged from the nozzled element, depending upon the location of the unit.

Consequently, as applied to water tube boilers, a controller must be employed which will actuate, in turn, the various units and it is, furthermore, advantageous to use a unit of the automatic valve type in which cleaning fluid is discharged through the nozzle in synchronism with the rotation of the nozzled element and over a predetermined blowing arc.

In Figures 8 and 9 the application of such a system to a conventional water tube boiler is shown. The boiler is designated generally by 72 and comprises tubes 73 extending between headers 74 and 75. Baffles 76 and 77 divide the tube bank into the usual passes for the flow of the gases from the combustion chamber.

The five boiler cleaner units are designated 78, 78$^a$, 78$^b$, 78$^c$, and 78$^d$ and may be distributed as desired throughout the passes of the boiler. 79 and 79$^c$ designate respectively the effective blowing arcs of units 78 and 78$^c$, these blowing arcs representing the portion of the revolution of the boiler cleaner unit through which the cleaning fluid is discharged adjacent the heating surfaces of the boiler. 80 designates the principal header for the cleaning fluid supply to the various boiler cleaner units, the branches from this header to their respective soot blower units being designated 81, 81$^a$, 81$^b$, 81$^c$, and 81$^d$. Cleaning fluid is supplied from the compressor 83 actuated by the motor 84, which motor is under the control of the double pole switch 85, power being supplied from the lines 86—87.

In Figure 9 the application of one of these units to the boiler is indicated. The operating head 78 is supported on floater 95 mounted on wall box 94 installed in opening 96 in boiler wall 93. The element 97 provided with nozzles 100 extends transversely of the boiler tubes 73 from which it is supported by bearings 98. The method of supporting the unit from the boiler tubes and the boiler wall is thus seen to be in the conventional manner. Mounted adjacent the storage tank 82 is the pressure limit switch 88 of conventional construction. When the pressure in the storage tank 82 reaches a predetermined maximum, switch 88 is actuated to close the circuit through lines 91—92 which lead to the motor driven controller 89 to be hereinafter described. From the supply header 80 a small air line 101 leads to the controller and the controller is actuated by its motor in such a manner that air is admitted in turn through the branch lines 102, 102$^a$, 102$^b$, 102$^c$, and 102$^d$ to actuate the respective soot blower units.

As will be hereinafter described, the controller is so constructed as to operate each unit a predetermined amount, the units being operated successively, the operation of one unit starting after the cessation of operation of the preceding unit.

The admission of air through the respective branches 102, 102$^a$, 102$^b$, 102$^c$, and 102$^d$ to the units, serves to actuate the unit rotatively and synchronously to open the supply valve admitting cleaning fluid to the nozzled element 97.

In Figures 10 to 14 inclusive one type of operating head is shown. Referring particularly to Figure 10, the element 97 is rotatively journaled in packing box 131 and in bushing 132 in the blower head 78. Fixed as by a set screw 111 to the element 97 is the gear 110 which, when actuated, serves to rotate the blower unit.

Referring now to Figure 11, when air is admitted from the controller through line 102 to the chamber 103, on top of piston 104, the pressure serves to move this piston downwardly against the force of the spring 105. Sleeve 106 at the bottom of the cylinder 103 serves to limit the downward movement of piston 104.

Pivoted at 133 to a lug on the inside of the piston is the bar 107 carrying the pawl 108. Leaf spring 109 at the back of the pawl serves to keep the pawl in engagement with the gear teeth on the gear 110. Downward movement of the piston 104 thus serves to rotate the gear and hence the blower element 97.

The extent of the sleeve 106 determines the number of teeth which the gear moves upon each actuation and hence the amount of arcuate travel of the element upon each actuation of the piston. It is obvious that this is subject to such variation as may be desired.

When the pressure of the fluid supplied to the piston reaches a predetermined minimum limit, spring 105 returns the piston 104 to its initial position where it is ready for the next impulse which is again administered upon the restoration of the maximum pressure. As the piston is restored to its initial position it, of course, pulls upwardly with it the bar 107 and the attached pawl 108. The spring 109 tending to urge this pawl against the gear 110 thus has somewhat of a tendency to reverse the direction of rotation of the gear 110. To prevent this rotation, a pawl 130 as shown in Figure 10 is provided to prevent reverse rotation of the gear. This pawl, engaging the gear teeth, permits rotation of the gear in the normal direction but acts against the gear teeth to prevent any reverse rotation.

In certain rotative positions of the blower element 97 the valve 122 is moved from its seat 123 to admit cleaning fluid from the supply line 81 to the blower element 97. Such admission of cleaning fluid is limited to any desired rotative position of the blower element 97. In other words, while this blower element is rotated through a complete 360° by the piston actuated pawl 108, cleaning fluid is supplied through the valve 122 only through a portion of this complete rotation as may be desired.

Fixed to gear 110 as by screws 116 is cam 115 whose extent determines the amount of blowing arc of the element or the amount of rotation of the element, through which the supply valve 122 is open.

Pivoted to the lower end of bar 107 is the lever 113 pivotally mounted in the fork 112 and provided at its other end with the roller 114. Extending from the fork 112 is the rod 117 provided with fork 118 at its opposite end, this fork being positioned 90° from the fork 112. Pivoted in the second fork 118 is the operating lever 119 for the valve 122. When the roller 114 is in contact with the cam 115 at the time that the piston is depressed, this contact point acts as a fulcrum for lever 113 moving downwardly the rod 117 and with it, the valve operating rod 119.

In the position of affairs shown in Figure 11, the piston is in the upward or inactive position. In Figure 14 the piston is shown in the downward position where it is moved under the influence of the pressure of the fluid admitted to the piston chamber 103 on top of the piston 104. In the state of affairs shown in Figure 14, roller 114 is not in contact with the cam 115 and as a result the rod 117 is not moved downwardly as the piston 104 moves downwardly. Consequently, the valve is not actuated.

When, however, the gear has been rotated by successive impulses of the pawl 108 to the position shown in Figure 13, so that the roller 114 contacts with the cam 115, actuation of the piston 104 acts to move downwardly the rod 117 and with it the valve operating rod 119.

As shown in Figure 10, the valve operating rod 119 is pivoted at one end to a fixed lug 120. It is pivotally attached at its opposite end to the valve stem 121 which enters the valve chamber 125 through packing box 124. As the rod 117 is moved downwardly in the position of affairs shown in Figure 13, it is obvious that the valve actuating lever 119 moves around its pivot point on lug 120 to pull the valve stem 121 downwardly and move the valve 122 away from its seat 123.

As will be evident from Figure 12, brackets 126 are provided at opposite ends of the valve chamber 125, to which brackets are attached springs 128 and 129. These springs assist in restoring the valve to the closed position upon the return of the piston 104 to its upward position shown in Figure 11.

It will be seen from the above that this operating head provides a construction whereby the element is rotated by impulses of the cleaning fluid on top of an operating piston which piston actuates suitable mechanism to rotate the element. As hereinbefore pointed out, this piston is operative between desired maximum and minimum pressure limits. As has, furthermore, been described, the control valve for the soot blower unit is actuated synchronously with the operation of the element over any desired fraction of the rotative movement of the element.

In the form of operating head just described, the valve is operated mechanically through a lever mechanism from the same piston that actuates the element. In the form of operating head shown in Figures 15 to 18 inclusive, the element is actuated in exactly the same manner as that described for the form shown in Figures 10 to 14 inclusive, but the valve is actuated by a piston under the control of a pilot valve instead of mechanically as in the first form of operating head described.

Referring now to Figures 15 to 18 inclusive, when air is admitted by the controller through line 102 on top of the piston 132, this is depressed carrying with it the pawl 133 which acts against the spring 144 to rotate the gear 145. Gear 145 is fixed to element 97 in any suitable manner as in the first described form.

In the line 102 leading from the controller is provided a T 146 from which leads line 147 to the pilot valve 148. At the same time that air is admitted on top of piston 132 it enters the pilot valve 148 through line 147, acting on the face of piston 149. This is connected through rod 150 to valve 151 so that when the piston 149 is moved to the right in Figure 18 it moves the valve 151 from its seat against the action of the spring 153.

The control valve 158 normally rests against its seat 159. The valve 158 is attached through rod 134 to piston 160 mounted in piston housing 168. Cleaning fluid from the supply line 81 entering the operating head through opening 136 acts both on the top of the valve 158 and on the face of the piston 160. Piston ring 135 is provided in piston 160, the piston ring being provided with a graduated opening admitting the cleaning fluid to the space 137 in the piston housing 168. This piston ring is constructed similarly to that shown in Figure 6a. Thus, under normal conditions the same pressure is established on each side of the piston 160, the valve being kept closed by the action of spring 169.

Upon venting of the pressure in the space 137 above the piston it is obvious that the pressure of the cleaning fluid acting on the face 138 of piston 160 will move the piston against spring 169, to open the valve.

It is the function of the pilot valve 148 hereinbefore described to provide a vent for the pressure in the space 137 permitting the valve to open.

As hereinbefore described, when the fluid pressure is admitted to the pilot valve 148, it moves the valve 151 from its seat 152 so that the pressure from the space 137 in the piston housing 168 passes through line 154, through valve 151 on top of the valve 171.

Referring now to Figure 17, it will be noted that the lever 155 is pivotally supported on the lug 156, this lever being adapted to engage the cam 157 fixedly mounted on gear 145. Cam 157 is made of the desired length in order to fix the period of opening of the supply valve 158. Thus, the length of the cam determines the fraction of rotative movement of the element 97 over which the control valve 158 is open.

When the lever 155 is engaged by the cam 157 it raises the stem 170 upwardly, moving the valve 171 away from its seat 172. When the valve 171 is moved from its seat 172, fluid pressure, admitted to the pilot valve 148 from the space 137 in the piston housing 168, passes to exhaust through openings 139.

It will thus be seen that when the controller admits the cleaning fluid to line 102 through T 146 and line 147 to pilot valve 148, that the result is to vent the pressure from space 137 only when the lever 155 has engaged the cam 157 so that both of the valves in the pilot valve are open.

If this trigger 155 does not engage the cam 157 the pilot valve 148 will not be fully open to exhaust and, consequently, the supply valve 158 will not open even though piston 149 does open valve 151.

It will be noted from Figure 16 that the amount of movement of the piston 160 is determined by the abutting of the skirt of the piston against the shoulder 167. This movement is sufficient to withdraw the valve 158 entirely within the piston housing 168, thus providing a relatively unobstructed passage for the cleaning fluid from line 81 to element 97, affording a construction giving the minimum pressure drop through the operating head.

We have indicated hereinbefore the characteristics of a controller suitable for use with either of the operating heads described as applicable to the second form of the invention. A motor operated controller construction has been indicated and we have shown diagrammatically in Figure 8 such a controller 89 which may be supported by brackets 90 from the wall of the boiler or any other convenient point.

In Figures 19 to 21, inclusive the detailed construction of this type of controller is indicated together with a wiring diagram which is necessary to explain its method of operation. In the wiring diagram, Figure 19, 86 and 87 are the electrical supply lines, the air storage tank is indicated at 82 and the supply header to the units at 80. All of the above is as shown on Figure 8 hereinbefore.

Before proceeding to a description of the wiring hook-up in the method of operation of the controller, it is necessary to outline briefly the essential features of construction of the controller as indicated in Figures 20 and 21. The motor 177 drives through gears 178 and 179 the shaft 180 to which is fixed worm 181. This worm in turn actuates the worm wheel 182 which is fixed to the vertical shaft 183. Fixed to the top of this shaft 183 is the collar 191 rotatable therewith. Surrounding shaft 183 is the bracket member 192, pressed into frictional engagement with collar 191 by spring 193. This frictional engagement between the bracket 192 and the collar 191 permits, under certain conditions, rotation of the bracket 192 by collar 191. It should be here stated as a basic principle of operation of the device, that the bracket 192 and associated parts, makes one complete revolution for a complete cycle of operation of the controller, whereas the shaft 183 makes a considerably larger number of revolutions dependent upon the particular operating conditions of the unit.

Pivotally mounted at 194 on the bracket 192 is the lever arm 195. This lever arm will rotate with the bracket 192 as the latter is driven by frictional engagement with collar 191. Rotative movement of the lever brings the end 213 thereof directly over the valve stems 199 of a series of pilot valves 212, 212$^a$, 212$^b$, 212$^c$, and 212$^d$. As shown in Figure 21 these pilot valves are arranged on the arc of a circle taken about the center of shaft 183.

Pivoted on the opposite end of lever 195 is the pawl 202 and lug 204 adapted to engage control ratchets 203, 203$^a$, 203$^b$, 203$^c$, and 203$^d$. As shown in Figure 21, these control ratchets mounted in suitable supporting brackets 215 are also arranged in the arc of a circle about the center of a shaft 183. It will be evident that the control ratchet for each pilot valve is located diametrically opposite to the pilot valve.

One complete rotation of the lever arm 195 about the shaft 183 is thus seen to bring the lever arm 195 in position to actuate in sequence the five pilot valves indicated which control the operation of the five soot blower units 78, 78$^a$, 78$^b$, 78$^c$, and 78$^d$ in Figure 8. The operation of these pilot valves is under the control of the ratchet wheels above mentioned as will be hereinafter described.

At the conclusion of an operative cycle of the controller the lever 195 is left in a position indicated by the line 213 on Figure 21 and provision is made to insure the leaving of the lever in this position, this provision to be hereinafter described.

Fixed to the gear 182 is the contact drum 184 engaged by contact brush 189, this contact drum being rotatable with the gear 182. Fixed to the bracket member 192 is the second contact drum 187 rotatable with the bracket member. This contact drum is provided with the two brushes 190 and 211 for a purpose to be hereinafter described. It is obvious that the contact drum 184 makes one revolution for each revolution of the gear 182 and shaft 183, whereas the contact drum 187 makes one revolution for the complete cycle of operation of the controller, as does the bracket 192.

As indicated particularly in Figure 19A, the contact drum 184 is provided with an interrupted portion 185 with which registers a contact strip 186 leading to the contact drum 187.

Registering with the contact drum 187 are the two brushes 190 and 211, this contact drum being provided with an interrupted portion 212 with which these brushes are in registry when the apparatus has completed its cycle in a position to begin the next succeeding cyclic operation.

Figure 19A thus represents the condition of the contact drums and brushes at the beginning of the cycle of operation.

It is obvious that provision must be made to start the actuation of the motor 177 to place the actuation of this motor and hence the controller under the influence of the pressure actuated valve 88 so that the controller will stop and start as the pressure is built up, blown out through the nozzled element to the minimum limit, shut off and again built up for the next puff. It is also necessary to provide in the wiring circuit provisions whereby the lever 195 under the control of the ratchet 203$^b$ will never be left in the downwardly pressed position with the pilot valve open to a unit. It is also necessary, as before pointed out, that the rotating control lever 195 be left in the position at the conclusion of the complete cycle of operation, indicated by the line 213 in Figure 21 for the beginning of the next cycle of operation.

Figure 20 being a section along line 20—20 of Figure 21, the control lever is in the position where it is just ready to start the actuation of the third pilot valve 212$^b$ controlling unit 78$^b$. However, this figure also represents the position of the lever 195 with respect to control ratchet 203 and pilot valve 212 at the beginning of a cycle of operation, it being understood that at such beginning the lever is in the position indicated by the line 213 and the contact drums 187 and 184 are in the relation indicated in Figure 19A.

In starting the complete boiler cleaning cycle, switch 85 in Figure 8 is closed, motor 84 operating the compressor 83 which fills storage tank 82 to the desired maximum pressure. When this pressure is attained the pressure actuated switch 88 closes. While the initial actuation of the controller motor 177 is not dependent upon the closing of switch 88, it is the usual practice to start the controller a few minutes after starting the compressor, this interval of time being sufficient to build up the desired maximum pressure. Continued actuation of the controller, once it is started and has been carried up to a certain point, is dependent upon the operation of the pressure actuated switch 88 and comes under the control of that switch.

When it is desired to operate the controller, switch 174 is closed, it being understood that there is one such double pole switch and one controller for each boiler to be cleaned, a single compressor, storage tank and pressure actuated switch 88 being applicable to a plurality of boilers.

Single pole hold switch 175, when actuated, completes the circuit from line 87 through lines 176, 176', motor 177, line 178, back to line 86. The closing of this switch thus starts the motor 177.

Through gears 178, 179, shaft 180, worm 181 and worm wheel 182, rotation of the motor thus rotates the vertical shaft 183 and with it, the contact drum 184. Switch 175 is held in until the motor has rotated sufficiently to move the contact drum 184 an amount sufficient to bring the contact strip 186 out of registry with the interrupted portion of drum 184 into contact with the drum itself. The hold switch may now be released, the motor continuing to operate on current supplied through the circuit 87, 188, brush 189, contact drum 184, contact strip 186, contact drum 187, brush 190, line 176', motor 177 and line 178, back to main 86.

Provision has thus been indicated for starting the motor and for short circuiting the starting switch after operation of the motor has reached a predetermined point.

In this initial actuation of the motor the lever arm 195 is rotated from the position indicated by the line 213 in Figure 21 until it contacts with the face of the first control ratchet 203. During this time the brushes 190 and 211 as shown in Figure 19A have moved away from the interrupted portion 212 of the contact drum 187 and are in contact with the active face of this drum. Current may thus be supplied to the motor through the upper contact drum and the upper brushes 190 and 211, the current passing through the line 86, double pole switch 174, line 176, motor 177, line 176', brush 190, drum 187, brush 211, line 188, double pole switch 174, line 91, through the pressure control switch 88 and line 92, back to the main 87. It will thus be seen how the apparatus is placed under the control, at this point, of the pressure control switch 88 and is actuated in dependence thereupon.

It will also be evident from following out the above wiring diagram that the current to the motor can not be cut off when the brush 186 contacts with the interrupted space 185 in drum 184 upon each rotation of the drum 184 with the shaft 183, since current is now supplied to the motor 177 through the upper drum and brush circuits under the control of the pressure actuated switch as before described.

Starting and stopping of the controller motor 177 is thus under the control of the maximum and minimum pressure limit switch 88 with certain limitations to be hereinafter described.

In the position of affairs indicated in Fig. 20 end 213 of the lever 195 is just over the valve stem 199 of the pilot valve 212$^b$. Fixed to the opposite end of lever 195 is a lug 216 which pivatally supports a pawl 202 adapted to register with the ratchet teeth of the control wheel 203$^b$. Lug 204 is further provided bearing against the outside face of this ratchet wheel in order to keep the pawl 202 in engagement with the wheel and to keep the lever 195 over the valve stem 199 until the actuation of each unit has been completed.

Through line 101, as indicated in Figure 21, air from the supply header 80 is supplied to the plenum chamber 201 underneath the pivot valves. Fixed to the collar 191 is the cam member 196 shown both in Figures 20 and 21. Rotation of shaft 183 brings this cam member under lug 198, rocking the lever 195 about its pivot 194. This rocking action moves the end of the lever 213 down on the valve stem 199, moving the valve 200 away from its seat and admitting air from the plenum chamber 201 through the line 102$^b$ to unit 78$^b$ for the operation of the unit as hereinbefore described. At the same time the rocking of the lever moves the pawl 202 to advance the ratchet control wheel 203$^b$ the distance of one tooth. This operation is repeated during the time pressure is built up and lowered due to blowing out the nozzled element until the pawl 202 has been actuated a sufficient number of times to move the lug 204 into registry with the open space in ratchet wheel 205 whereupon frictional engagement of the collar 191 with the bracket 192 moves the lever around until lug 204 contacts the face of the next ratchet wheel and the unit is in position to operate the next boiler cleaner unit.

As hereinbefore pointed out, breaking of the circuit through switch 88 will stop the motor upon reaching of the predetermined minimum pressure limit, stopping the action of the controller until the pressure has again been built up. It is necessary, however, that the lever 195 be moved into the position indicated in Figure 20 before the actuation of the motor is stopped so that the pilot valve 212b may be closed permitting pressure to build up in the line for the next puff.

From the description of the wiring connections hereinbefore given it will be evident that the motor is capable of actuation independent of the pressure actuated valve 88 and associated circuits through the line 188, brush 189 and contact drum 184, contact member 186 leading to the contact drum 187. Thus, if the pressure switch is interrupted while the lever 195 is holding one of the pilot valves 212 open, rotation of the motor is continued through circuit 188, brush 189, drum 184, contact member 186 and drum 187 until the contact member 186 registers with the interrupted portion 185 of contact drum 184, whereupon the motor stops until the next building up of maximum pressure closes the pressure actuated switch 88.

It is obvious that the drum 184 must be so fixed with respect to shaft 183 that the interrupted portion of said drum registers with the contact strip 186 when the lever 195 is in the position indicated in Figure 20 and is clear of the valve stem 199. This is accomplished by proper fixing of the drum 184 with relation to the cam member 196 on collar 191 as will be self-evident.

The ratchet control wheel 203b is provided with a series of holes 206b in which may be fixed a pin 207b to control the amount of actuation of each individual pilot valve. To the shaft 208b on which the ratchet wheel 206b is fixedly mounted is attached the chain 209b carrying the weight 210b. In the position of affairs shown in Figure 20, the ratchet wheel is moved clockwise until the space 205 comes opposite the lug 204 permitting the operating lever to pass to the next unit. The pin 207b is, of course, moved clockwise with the ratchet wheel to a point indicated at 217. The chain 209b is, in the meantime, wrapped around the shaft 208b. As soon as the lug 204 has passed through the opening 205 and on to the face of the next ratchet control wheel the weight 210b returns the ratchet control wheel 203b to exactly its original position, this being controlled by contact of the pin 207b with the chain 209b as will be self-evident.

The above indicated cycle of operation is completed until the lever 195 has acted upon each of the pilot valves for the desired period of time, as determined for each pilot valve, by the positioning of the pin 207b. Contact brushes 190 and 211, in the meantime, continue to supply current to the motor 177 until they reach the interrupted portion of drum 187, when the current is shut off the motor. The interrupted portion of drum 187 is so located with respect to lever 195, that when brushes 190 and 211 engage this portion of the drum, stopping the motor, lever 195 is left in the position indicated by line 213 on Figure 21. The controller is thus in position for the next cycle of operation.

It will thus be seen that we have provided a controller mechanism adapted to actuate successively each of a series of pilot valves controlling the operation of the soot blower units applied to the boiler. Means have been provided to start the actuation of the controller and to short circuit the starting means whereby the operation may be continued. Means are also provided to then place the controller under the operation of the maximum and minimum pressure actuated switch and means have been provided to be sure that no pilot valve is left open at any time to any unit when the current is shut off through the pressure actuated switch upon attainment of the minimum pressure limit.

Means are further provided for regulation exactly of the amount of work to be done by each unit by controlling exactly the number of impulses applied to each particular unit. Means have also been provided to assure that the lever which operates the pilot valves is always left in exactly the same position for the starting of the next operative cycle of the controller. It will thus be seen that a very flexible control means is provided, capable of a wide adjustment to meet the particular conditions encountered by each individual installation.

Note should here be made of the fact that each impulse applied to the operating head moves the head rotatively a definite amount. As has been pointed out, this amount of movement may be made to suit conditions by determination of the piston travel, but once fixed in this manner, does not vary ordinarily upon successive impulses. This is true, whether the valve in the operating head be opened or closed. If opened, with air blowing out the nozzled tube, the time element before restoration of pressure and application of the next impulse is materially longer than if the valve in the operating head be closed, and air be lost to reduce the pressure only by leakage around the piston—plus, of course, any leakage loss in the lines. It may be here stated that in actual commercial installations, the time interval between impulses with the valve open has been found to vary from 2½ to 3 minutes with the valve in the operating head open, and from 4 to 5 seconds with the valve closed.

Figure 22:
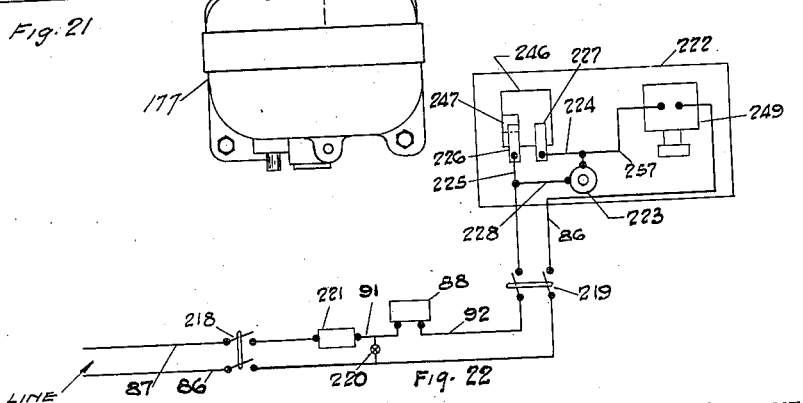
Figure 22 is a wiring diagram for a second type of controller utilized in the second form of the invention.

The second type of controller adapted for use with the hereinbefore described operating heads is shown in Figures 22 to 27 inclusive, Figure 22 being a wiring diagram showing the electrical hook-up. Referring first to this figure, the electrical supply lines 87 and 86 are the same as hereinbefore indicated. For each complete installation, it is necessary to provide a double pole switch indicated at 218, together with a thermal flasher indicated at 221, the pressure controlled switch 88 and the lamp 220. For each boiler it is necessary to provide a double pole switch indicated at 219 and the controller to be hereinafter described, designated as 222.

In this particular type of controller, it is necessary that the pressure actuated switch 88 be closed by building up of the pressure in the storage tank 82 to the desired maximum limit. This pressure actuated switch is, in this form, the same as in the previous form of controller described. The thermal flasher 221 is the conventional flasher construction and may be set to operate at desired intervals. In practice it has been found desirable to operate this flasher at approximately 5 second intervals. The lamp 220 which may be conveniently a 60-watt bulb is inserted in the circuit ahead of the pressure controlled switch to keep the flasher hot while the pressure switch may be open at low pressure periods.

In operation using the second type of controller, it is necessary to operate the compressor until the maximum pressure has been built up in the storage tank and the supply line 80 to the soot blower units. Double pole switch 218 is then closed, the flasher starting to operate very shortly thereafter. The double pole switch 219 is then thrown on the boiler which it is desired to clean.

Referring now to the controller construction itself, this constitutes essentially a multiported valve designated at 232 provided with the space 256 into which air from the supply line 80 is led through the line 101 and a valve 255. This valve comprises a valve member 231 which is attached to the under side of piston 230, the pressure of the cleaning fluid being adapted to act on the under side of this piston and open the valve when pilot valve 258 is raised to vent the pressure above the piston, the action being similar to that already outlined for similar valves hereinbefore described.

Exciting of the solenoid 249 raises the weight 229 permitting the cleaning fluid to act on the under side of piston 230, raising the valve 231 from its seat and admitting air from line 101 to the space 256 inside the multiported valve.

This multiported valve consists, essentially, of a stationary plate 236, forming a part of the valve housing, which plate is provided with the five holes 235, 235$^a$, 235$^b$, 235$^c$, and 235$^d$, leading respectively to the outlets 102, 102$^a$, 102$^b$, 102$^c$, and 102$^d$ leading to the respective soot blower units. Engageable with the stationary plate 236 is the rotatable plate 233 provided with the elongated curved slot 234 as best indicated in Figure 27. Registration of this elongated slot with each of the holes 235 and so forth, successively admits air through suitable connections to the various operating heads.

The rotatable valve member 233 is fixed to shaft 251, which, in turn, is fixed to gear 245, this gear being rotated by the successive impulses of the cleaning fluid, as it is supplied to the controller. From the space 256 a supply line 237 shown in Figure 23 leads to the inlet end of the piston housing 238. When cleaning fluid is admitted to this piston housing, it acts on the face of the piston 239, moving this to the left in Figure 26 against the spring 240.

Attached to the piston 239 is the pin 242 carrying the pawl 243. When the pressure to the piston is shut off, as by closing of valve 231, a spring 240 returns the piston, at which time the pawl 243 acts upon the gear 245 to move the same counter-clockwise the distance of one tooth. The pawl 244 is provided to act as a drag member and to limit rotative movement of gear 245 to one tooth.

Fixed in the face of gear 245 are the pins 253, these being identical in number with the number of units to be operated. A second pawl 254 is fixed to shaft 242, this pawl being adapted to register with the pins 253 at suitable intervals, it being the function of this arrangement to advance the gear 245 to the next successive position so that the elongated port 234 in the rotary valve member 233 will register with the next hole 235$^a$ in the stationary plate 236. The operation of this will be hereinafter described in greater detail.

Attached to gear 245 and rotatable therewith is the contact drum 246 with which registers the two brushes 226 and 227, best shown in Figure 26 and indicated also in the wiring diagram Figure 22. The contact drum 246 is provided with an interrupted portion 247 with which in the starting position brush 226 is adapted to register.

With the pressure actuated switch 88 closed and with the flasher 221 in operation, switch 219 to the boiler to be cleaned is closed. The single pole hold switch 223 is closed completing the circuit through line 86, solenoid 249, line 257, switch 223, line 92, pressure actuated switch 88, line 91, thermal flasher 221 and back to line 87. With the switch 223 held closed, each excitation of the thermal flasher 221 excites the solenoid 249, permitting the valve 231 to open at each excitation. Air is thus admitted from the chamber 256 through line 237 to actuate the piston 239, which, as has been hereinbefore explained, moves the gear 245 the distance of one tooth upon each actuation. As the gear is actuated the contact drum 246 is moved around until brush 226 comes out of the interrupted portion of the contact drum 247, whereupon the single pole hold switch 223 is short circuited through line 225, brush 226, drum 246, brush 227 and line 224, whereupon the switch may be released.

It is evident that the controller is actuated only when the pressure in the supply line to the boiler cleaner units is between the maximum and minimum desired limits. It is, furthermore, evident that actuation of the controller takes place under this particular condition upon each successive impulse of the flasher 221. When the controller is started, the relation of the valve members is as indicated in Figure 27. Successive excitations of the solenoid 249 under the control of the thermal flasher 221 and pressure actuated switch 88 moves the gear 245 and with it the rotatable valve member 233 in the direction indicated by the arrow in Figure 27, the curved slot being continuously in registry with the hole 235 in plate 236. When the end of this slot is reached, the gear 245 is rotated so that the curved slot 234 in the rotatable valve member 233 comes into registry with the next hole 235$^a$ by virtue of engagement of the pawl 254 with the pins 253, the horizontal reciprocating motion of the pin 242 fixed to piston 239 being transmitted to gear 245 by virtue of this engagement of the pawl with the pin.

The cycle is obviously carried on until all five of the boiler cleaner units have been operated whereupon the controller may be shut down by pulling the switch 219.

At the completion of operation and before the switch 219 has been pulled to definitely shut off the controller, this latter has shut itself off automatically at the completion of the cycle due to engagement of the contact brush 226 with the interrupted portion 247 of contact drum 248.

The extent of the arcuate port 234 in the rotatable valve member 233 may be so arranged with respect to the number of gear teeth in 245 as to impart any desired number of impulses to the boiler cleaner operating head. Considered in connection with the construction of the head, matters may be so arranged as to insure that a predetermined number of impulses applied to the head move this a definite rotative amount.

Thus, in the operating head, as shown in Figure 17, the gear 145 may be provided with eighty teeth. The pawl 133 may be adapted to actuate gear 145 the distance of four teeth at each power impulse, thus requiring a total of 20 impulses to rotate the nozzled tube 97 through exactly 360°. To accomplish this result with the second type of controller described, the extent of the arcuate port 234 may be made with such relation to gear 245 as to insure that the gear 245 is moved a distance of twenty teeth by the pawl 243 while the arcuate port 234 in the rotatable valve member 233 is in registry with one of the holes 235 in the stationary valve plate 236. It has been found in practice that such a proportioning of the parts affords a very satisfactory operation but it should be pointed out that these proportions may be varied to secure any desired actuation of the boiler cleaner operating head. With the construction of the second controller it is convenient to limit this amount of arcuate actuation to one complete revolution or less, whereas in the controller of the first type described, arcuate travel may very conveniently be three complete rotations or any fraction thereof. It is obvious that the proportions of the parts might be varied in both instances to secure any desired results.

In Figures 28 to 31, inclusive, a slightly modified form of operating head is disclosed in which the rotation or movement of the blower element is dependent upon a prior opening of the valve which controls the flow of cleaning fluid to the blower element. The admission of pressure fluid to the blower head from the controller is utilized to effect an opening of the valve which controls the flow of cleaning fluid to the blower element. It is to be understood that either form of controller previously described may be utilized in supplying pressure fluid to the construction about to be described.

Referring then particularly to these figures of the drawings, it will be noted that the blower element 97 is journaled in a suitable head which is similar in construction to the head shown in Figures 15 to 17, inclusive. Cleaning fluid is supplied to the blower head by a supply pipe 81, there being provided a valve 260 between the supply pipe and the blower element. This valve is secured to a stem 261 which in turn is secured to a piston 262 reciprocable in a chamber 263 formed in a suitable casing secured to the blower head. The piston is provided with a piston ring 264 which may have a suitable graduated opening whereby cleaning fluid may leak past the piston to build up a pressure back of the same. A spring 265 is located in the chamber 263 and holds the valve 260 to its seat 266 when pressures on opposite sides of the piston are equal.

Communicating with the chamber 263 is a conduit 275 to which a fitting 276 is secured. This fitting provides a passage between the conduit 275 and the conduit 102 which, as brought out before, may be in communication with either of the controllers heretofore described.

Mounted in the fitting 276 is a piston 277 to which a valve 278 is secured. The spring 279 normally holds the valve 278 in engagement with its seat 280 to prevent communication between the conduit 275 and exhaust ports 281 formed in the fitting 276.

It will be obvious that whenever pressure fluid is admitted to the fitting by way of conduit 102, the piston 277 will be actuated to move the valve 278 against the force exerted on the same by the spring 279 and to thus permit the pressure in chamber 263 to be exhausted by way of ports 281. Whenever, therefore, valve 278 is opened, the pressure fluid acting on the face of piston 262 will cause this piston to move longitudinally of the chamber 263 to thus open valve 260 and admit the cleaning fluid from supply pipe 81 to the blower element 97. As in the previously described form of construction shown in Figures 15 to 17, inclusive, piston 262 may be provided with a skirt 282 to limit its movement longitudinally of the chamber 263.

As brought out before, in this embodiment of the invention, provision is made that movement of the blower element will be dependent upon a prior actuation of the valve which controls the flow of cleaning fluid to the blower element. Accordingly there is provided a conduit 290 which is tapped into the blower head to communicate with the cleaning fluid passage immediately beyond the valve 260. This conduit in turn is tapped into a casing 291 formed on one side of the blower head and in which the actuating mechanism for the blower element is located. It will be obvious that the positioning of the conduit 290 is such that pressure fluid is only supplied to this conduit and thus to the actuating mechanism for the blower element when the control valve 260 for the element has been moved sufficiently to permit the flow of cleaning fluid past this valve.

The actuating mechanism for the blower element comprises a piston 295 located in the casing 291. A spring 296 normally holds the piston in the position shown in Figure 30 of the drawings and thus returns the piston to this position whenever the valve 260 is closed.

Pivotally secured to piston 295 is a double-acting pawl 297 arranged to engage teeth 298 on a gear 299 fixed to the blower element 97. The pawl 297 is provided with an arm 300 which extends into the path of pins 301 and 302 fixed to the face of gear 299. A spring 303 secured to the free end of the arm 300 and to a projection on the piston 295 tends to snap the arm past its dead center position whenever the arm is engaged by either of the pins 301 or 302. It will be apparent that the position to which the pawl 297 is rocked by the pins 301 and 302 will determine the direction of movement of gear 299 and thus of blower element 97 incident to a reciprocation of piston 295.

To frictionally restrain gear 299 against rotation and to thus render the intermittent rotation of this gear more smooth, there is provided a toothed member 305 which is constantly urged into engagement with the teeth 298 of the gear 299 by a spring 306. The toothed member 305 will move into engagement with successive teeth of the gear 299 as the latter is rotated by the pawl 297 carried by piston 295.

It is believed that the operation of this form of construction will be apparent from the above description. Whenever a pressure fluid is supplied to the fitting 276, the valve 278 will be opened to thus exhaust the pressure from chamber 263. The pressure of the cleaning fluid then acting on the face of piston 262 will move this piston to open valve 260 to admit cleaning fluid from supply pipe 81 to the blower element 97.

As valve 260 is opened, the cleaning fluid under pressure will pass through conduit 290 and will act on piston 295 to move the same against the force exerted by spring 296. Obviously, whenever valve 260 is closed, the spring 296 will return piston 295 to its original position.

Reciprocation of piston 295 will effect a rotation of gear 299 and thus of the blower element 97. The direction of rotation of gear 299 and thus of the blower element will be dependent upon the position of the double-acting pawl 297 and the operating position of this pawl will be periodically changed as one or the other of pins 301 or 302 engage the end of arm 300. Pins 301 and 302 being carried by gear 299 move with the latter so as to effect a rocking of the double-acting pawl after a predetermined rotation of gear 299 in either direction. It will be understood that if desired the pins 301 or 302 may be adjustably mounted on gear 299 so that the extent of rotation of this gear may be adjusted at will.

While several forms of the invention have been described with some detail, it is to be clearly understood that the description is for the purposes of illustration only and is not definitive of the limits of the inventive idea. The right is reserved to make such changes in the details of construction and arrangement of parts as will fall within the purview of the attached claims.

What we claim as our invention is:

1. In a fluid heater cleaner, a plurality of blower elements, a source of cleaning fluid under pressure, means for effecting sequential movement of said blower elements, and means operating to terminate the operation of said first mentioned means upon a predetermined decrease in the pressure of the cleaning fluid.

2. In a fluid heater cleaner, a plurality of movable blower elements, a source of cleaning fluid under pressure, means for effecting a sequential movement of said blower elements, and means operating when the cleaning fluid reaches a predetermined maximum pressure and independently of the movement of said blower elements to effect an actuation of said first mentioned means and operating when the cleaning fluid reaches a predetermined minimum pressure to stop the operation of said first mentioned means.

3. In a fluid heater cleaner, a plurality of movable blower elements, means for sequentially supplying cleaning fluid to said blower elements, means for effecting a sequential movement of said blower elements, and means operating when the cleaning fluid reaches a predetermined maximum pressure and independently of the movement of said blower elements to effect an actuation of both of said first-mentioned means and operating when the cleaning fluid reaches a predetermined minimum pressure to stop the operation of both of said first-mentioned means.

4. In a fluid heater cleaner, a plurality of movable blower elements, means operating to sequentially impart step by step movements to said blower elements, said means providing that a plurality of step by step movements are imparted to each element before step by step movements are imparted to the next element, and means for regulating the number of step by step movements imparted to each element to a definite predetermined plural number.

5. In a fluid heater cleaner, a pair of movable blower elements, means including a reciprocable member associated with each blower element for moving the same, and means operating to impart a definite plural number of reciprocable movements first to one of said reciprocable members and then to the other of said reciprocable members.

6. In a fluid heater cleaner, a pair of movable blower elements, means including a piston associated with each blower element for moving the same, and means operating to impart a definite plural number of power impulses first to one of said pistons and then to the other of said pistons.

7. In a fluid heater cleaner, a plurality of blower elements, a valve so associated with each blower element as to control the operation thereof, a movable valve actuating member, means for moving said valve actuating member to sequentially bring the same into operative relation with respect to said valves, and means for moving said valve actuating member a plural number of times each time it is brought into operative relation with respect to each valve and without movement of the valve actuating member out of operative relation with respect to the valve being actuated to cause the valve actuating member to actuate each valve a plural number of times before the next valve in the sequence is actuated.

8. In a fluid heater cleaner, a plurality of blower elements, and means for controlling the operation of said blower elements including a plurality of valves, one valve controlling the operation of each blower element, a valve actuating lever, means for intermittently moving said lever to bring the same into operative relation with respect to each valve, means for holding said valve actuating lever in operative relation with respect to each valve for a predetermined interval of time, and means for moving said valve actuating lever during said interval while the same is in operative relation with respect to each valve to cause the valve actuating member to actuate each valve a plural number of times.

9. In a fluid heater cleaner, a plurality of blower elements, a valve for controlling the actuation of each blower element, and means for actuating said valves including a valve actuating lever, a shaft mounting said lever for moving the same into operative relation with respect to one of said valves at a time, means for moving said shaft, means for periodically holding said valve actuating member against movement with said shaft to hold the valve actuating member in operative relation with respect to each valve for an interval of time, and means for actuating said member a plural number of times during said interval.

10. In a fluid heater cleaner, a plurality of blower elements, a valve for controlling the operation of each blower element, a rotatable shaft, a valve actuating lever mounted on said shaft and adapted to be frictionally moved by said shaft, said valve actuating lever when moved by said shaft moving successively into operative relation with respect to said valves, means for periodically restraining said valve actuating lever against movement with said shaft to temporarily hold the same in operative relation with respect to each of said valves, and means for moving said valve actuating lever while the same is so restrained against movement with said shaft to cause the valve actuating lever to actuate each valve a plural number of times.

11. In a fluid heater cleaner, a plurality of blower elements, a valve for each element for controlling the operation thereof, said valves being arranged in spaced relation to each other and on an arc, a rotatable shaft, a member carried by said shaft and adapted to be frictionally moved thereby, a valve actuating lever carried by said member adapted when said member is moved with said shaft to be brought into successive registration with said valves, a plurality of ratchet wheels disposed in the path of movement of said member for periodically restraining said member against rotation with said shaft whereby said valve actuating lever is periodically held in registration with each of said valves, means for rocking said lever while the same is held in registration with each valve to cause the same to actuate the valve with which it registers, and means operating upon rocking of said lever to move the ratchet wheel which is restraining the movement of said member with said shaft to a position whereby said member may again move with said shaft.

12. In a fluid heater cleaner, a plurality of blower elements, and means for controlling the operation of said elements including a stationary valve member having a port therein for each of said elements, a movable valve member having an elongated port adapted to be brought successively into registration with the ports in said stationary member upon movement of said movable valve member, means for slowly moving said movable valve member while the port therein registers with one of the ports in the stationary valve member, and means for rapidly moving said movable valve member to move the port therein from registration with one of the ports in said stationary valve member into registration with another of the ports in said stationary valve member.

13. In a fluid heater cleaner, a plurality of blower elements, and means for controlling the operation of said elements including a chamber, means for periodically admitting a fluid under pressure to said chamber, a member forming one side of said chamber and having a plurality of spaced ports, a movable member disposed in said chamber and having an elongated port adapted to be brought into registration with the ports in said first mentioned member, and means operating upon the admission of fluid to said chamber to slowly move said movable valve member while the port therein is in registration with one of the ports in said first mentioned member and to rapidly move said movable valve member to move the port therein from registration with one of the ports in said first mentioned member to another of the ports in said member.

14. In combination a series of blower elements, an actuating means for each blower element arranged to move the same, a source of power, means connecting said source of power to all of said actuating means, and a single control means associated with said last mentioned means so constructed and arranged as to cause power to be sequentially applied to said actuating means, said control means including means operating to cause power to be supplied to each actuating means in a series of impulses in such a sequence that a series of power impulses is imparted to each actuating means before a series of power impulses is supplied to the next actuating means in the series.

15. In combination a series of blower elements, a valve associated with each blower element for controlling the flow of cleaning fluid to the same, an actuating means associated with each blower element for moving the same, a source of supply of power, means connecting said source of supply of power to all of said actuating means, a single control associated with said last mentioned means so constructed and arranged as to cause power to be sequentially applied to said actuating means, said control means including means operating to cause the power to be supplied to each of said actuating means in a series of impulses in such a sequence that a series of power impulses is imparted to each actuating means before a series of power impulses is supplied to the next actuating means of the series, and means associated with each blower element for effecting an operation of its respective valve in timed relation to the operation of its respective actuating means.

16. In combination a series of blower elements, an actuating means associated with each element for moving the same, a source of power for all of said actuating means, means connecting said source of power to said actuating means, a single control means associated with said last mentioned means so constructed and arranged as to cause power to be sequentially applied to said actuating means, said control means including means operating to cause power to be supplied to each of said actuating means in a series of impulses in such a sequence that a series of power impulses is imparted to each actuating means before a series of power impulses is supplied to the next actuating means of the series of elements, a valve associated with each blower element for controlling the flow of cleaning fluid to the same, means for operating each valve in timed relation to the operation of the actuating means of its respective element, and means for limiting the actuation of each valve to a portion of the movement of its respective blower element.

17. In combination a series of blower elements, a valve associated with each of said blower elements for controlling the supply of cleaning fluid to the same, an actuating means for each valve, and a single control for controlling the actuation of all of said valve actuating means, said control being so constructed and arranged as to cause said valve actuating means to be actuated according to a desired sequence and said control including means operating to cause each valve actuating means to be actuated a definite predetermined plural number of times before the next valve actuating means in the series of elements is actuated.

18. In a fluid heater cleaner, a plurality of blower elements, and means for controlling the operation of said blower elements, said means including a plurality of valves, a movable valve actuating member, means for moving said valve actuating member to bring the same into operative relation with respect to each valve according to a desired sequence of the valves, means for holding the valve actuating member in operative relation with each valve for a plural number of valve actuating movements of the valve actuating member, and means for moving the valve actuating member while the same is so held to cause the same to actuate the valve with which it is in operative relation.

19. In a fluid heater cleaner, a plurality of blower elements, a source of cleaning fluid under pressure, a distributor connected to said blower elements and adapted to cause cleaning fluid to be supplied sequentially to the same, a valve associated with the distributor, means for opening the valve when the cleaning fluid reaches a predetermined maximum pressure, means for closing the valve when the cleaning fluid reaches a predetermined minimum pressure, and a separate means controlling opening and closing of the valve in addition to the other means whereby the valve is periodically opened and closed when the pressure of the cleaning fluid is between said maximum and minimum limits.

20. In a fluid heater cleaner, a plurality of rotatable blower elements, a source of cleaning fluid under pressure, a pressure operated power device operatively connected with each of the elements to rotate the same, a connection between each blower element and the source of cleaning fluid, a valve in each connection, pressure actuated means for actuating each valve, a controller so constructed and connected to said power devices, valve actuating means and cleaning fluid pressure source as to supply cleaning fluid to the power device and the valve actuating means of one of said elements at a time according to a desired sequence of the elements, and means associated with each element to prevent its associated valve from opening during a portion of the rotation of the element.

21. In a fluid heater cleaner, a plurality of rotatable blower elements, a source of cleaning fluid under pressure, a power device associated with each of the elements to rotate the same, a connection between each blower element and the source of cleaning fluid, a valve in each connection to control the supply of cleaning fluid to its respective element, means associated with each valve for actuating the same, a controller so constructed and connected to said power devices as to impart a plurality of power impulses to each of the power devices according to a desired sequence of the elements, means tending to cause each valve actuating means to open its respective valve each time a power impulse is imparted to the blower element with which the valve is associated, and means operating to prevent each valve from opening during a portion of the rotation of the blower element with which it is associated.

22. In a fluid heater cleaner, a plurality of movable blower elements, a source of cleaning fluid under pressure, a pressure operated power device operatively connected with each element for moving the same, a valve so associated with each element as to control the supply of cleaning fluid to the element, pressure actuated means for actuating each valve, a controller so constructed and so connected to said power device, valve actuating means and cleaning fluid pressure source as to supply cleaning fluid to the power device and the valve actuating means associated with the elements according to a desired sequence of the elements, and means operating to periodically interrupt the supply of cleaning fluid to a given power device and associated valve actuating means when the pressure of the cleaning fluid is between predetermined limits.

23. In a fluid heater cleaner, a plurality of rotatable blower elements, a source of cleaning fluid under pressure, a power device so associated with each of the elements as to rotate the same, a valve so associated with each of said elements as to control the supply of cleaning fluid to the element, a controller so constructed and so connected to said power devices as to impart a plurality of power impulses to one of said power devices at a time according to a desired sequence of the elements, and means governed by the controller for actuating each valve during a portion only of the rotation of its associated element.

24. In a fluid heater cleaner, a series of blower elements, a source of cleaning fluid under pressure, a valve associated with each of said blower elements for controlling the supply of cleaning fluid to the same, an actuating means for each valve, and a control for controlling the actuation of all of said valve actuating means, said control being so constructed and arranged as to cause said valve actuating means to be actuated one at a time according to a desired sequence and said control so governing said valve actuating means as to cause each valve actuating means to open and close its respective valve a plural number of times before the next valve actuating means in the series of elements is actuated.

HARRY E. BRELSFORD.
CURTIS L. HOWSE.
FRANK BOWERS.